(12) United States Patent
Fujikake et al.

(10) Patent No.: US 6,573,330 B1
(45) Date of Patent: Jun. 3, 2003

(54) PROCESS FOR PREPARING WATER-ABSORBENT RESIN

(75) Inventors: Masato Fujikake, Himeji (JP); Yasuhiro Nawata, Himeji (JP); Magoto Shirakawa, Himeji (JP); Masakazu Yamamori, Himeji (JP); Shioko Yoshinaka, Himeji (JP); Morio Nakamura, Himeji (JP)

(73) Assignee: Sumitomo Seika Chemicals, Co., Ltd., Hyogo (JP)

( * ) Notice: Subject to any disclaimer, the term of this patent is extended or adjusted under 35 U.S.C. 154(b) by 0 days.

(21) Appl. No.: 09/208,422

(22) Filed: Dec. 10, 1998

Related U.S. Application Data

(63) Continuation of application No. 08/875,039, filed as application No. PCT/JP96/03454 on Nov. 25, 1996, now abandoned.

(30) Foreign Application Priority Data

Nov. 30, 1995 (JP) .............................. 7-337752

(51) Int. Cl.$^7$ ....................... C08F 265/02; C08F 291/00
(52) U.S. Cl. ....................... 525/54.31; 525/64; 525/191; 525/192; 525/218; 525/221; 525/225; 525/227
(58) Field of Search ....................... 525/64, 903, 54.31, 525/191, 192, 218, 221, 225, 227

(56) References Cited

U.S. PATENT DOCUMENTS

| | | | |
|---|---|---|---|
| 5,374,684 A | * 12/1994 | Tai | 525/254 |
| 5,408,006 A | 4/1995 | Rebre | 525/301 |
| 5,455,284 A | 10/1995 | Dahmen | 522/85 |

FOREIGN PATENT DOCUMENTS

| | | |
|---|---|---|
| DE | 40 21 847 A1 | 1/1992 |
| EP | 0 441 507 A1 | 8/1991 |
| JP | 04130113 | * 5/1992 |

* cited by examiner

*Primary Examiner*—Jeffrey Mullis
(74) *Attorney, Agent, or Firm*—Connolly Bove Lodge & Hutz LLP

(57) ABSTRACT

A process for preparing a water-absorbent resin is provided which enables the water-absorbent resin to ensure the reduction in the release amount of liquid and the increase in the liquid diffusibility. In the preparation process, the water-absorbent resin is prepared by polymerization of a water-soluble ethylenic unsaturated monomer. The polymerization of the water-soluble ethylenic unsaturated monomer is allowed to take place in the presence of a water-absorbent resin having a water-absorbing rate different from that of a water-absorbent resin resulting from polymerization of the water-soluble ethylenic unsaturated monomer. In a preferred mode, the polymerization is performed by a reversed-phase suspension polymerization method.

20 Claims, No Drawings

PROCESS FOR PREPARING WATER-ABSORBENT RESIN

CROSS REFERENCES TO RELATED APPLICATIONS

This is a continuation of application Ser. No. 08/875,039, filed Jul. 17, 1997 now abandoned, which is the U.S. National Phase application of PCT/JP96/03454, filed Nov. 25, 1996.

FIELD OF THE INVENTION

The present invention relates to processes for preparing a water-absorbent resin and, more particularly, to processes for preparing a water-absorbent resin by polymerization of a water-soluble ethylenic unsaturated monomer.

BACKGROUND OF THE INVENTION

Water-absorbent resins have found wide application in the fields of sanitary materials such as menstrual articles and disposable diapers, agricultural materials such as water retention agents and soil conditioning agents, and industrial materials such as cutoff materials and anti-dewing agents. Particularly, the water-absorbent resins are advantageously used in the field of the sanitary materials. Generally known as the water-absorbent resins for use in the aforesaid fields are lightly crosslinked polymeric resins. Examples thereof include starch type water-absorbent resins such as a hydrolyzate of a graft copolymer of starch and acrylonitrile (Japanese Examined Patent Publication No. 49-43395 (1974)) and a neutralized graft copolymer of starch and acrylic acid (Japanese Unexamined Patent Publication No. 51-125468 (1976)), a saponified copolymer of vinyl acetate and acrylic acid ester (Japanese Unexamined Patent Publication No. 52-14689 (1977)), and a partially neutralized polyacrylic acid (Japanese Unexamined Patent Publications No.62-172006 (1987), No. 57-158209 (1982) and No. 57-21405 (1982)).

Properties required for a water-absorbent resin, particularly, in the field of the sanitary materials include a high water-absorbency, a high water-absorbing rate, a high gel strength after water absorption, a low content of fine particles, and a sharp distribution of particle size. Where the water-absorbent resin is compounded with a pulp material to form a water-absorbent material for the sanitary materials, the water-absorbing rate is an important factor which influences the properties of the water-absorbent material, i.e., the reduction in the release amount of once absorbed liquid from the water-absorbent material and the increase in the diffusibility of the absorbed liquid into interior of the water-absorbent material.

Where a water-absorbent resin having a relatively low water-absorbing rate is employed, for example, the resulting water-absorbing material exhibits an excellent liquid diffusibility. However, when the water-absorbent material is pressed (e.g., when a baby wearing a disposable diaper comprised of such a water-absorbent material sits immediately after urination), the release amount of liquid is increased because the water-absorbent resin requires much time for the liquid absorption. In addition, if the liquid supply rate to the water-absorbent material is higher than the water-absorbing rate of the water-absorbent resin, excess liquid may leak from the water-absorbent material.

Where a water-absorbent resin having a relatively high water-absorbing rate is employed for the water-absorbing material, on the other hand, liquid absorption by the water-absorbent resin locally occurs in a portion of the water-absorbent material to which liquid is supplied, and the water-absorbent resin in that portion swells and gelatinizes to cause blocking. In such a case, the liquid diffusion into the water-absorbent material is blocked by the gelatinous water-absorbent resin, so that the liquid is prevented from spreading throughout the water-absorbent material. As a result, the release amount of the absorbed liquid is increased.

Therefore, a water-absorbent resin exhibiting initially a high water-absorbing rate and thereafter a moderate water-absorbing rate is desirable for a water-absorbent material in order to reduce the liquid release amount and increase the liquid diffusibility. A mixture of a water-absorbent resin component having a high water-absorbing rate and a water-absorbent resin component having a low water-absorbing rate may afford a water-absorbent resin having such properties. The water-absorbent resin mixture, however, is less homogeneous because it is prepared by mixing a plurality of kinds of water-absorbent resins having different particle diameters and different bulk densities. Hence, no practical solution to the aforesaid problem has been found yet.

It is, therefore, an object of the present invention to prepare a water-absorbent resin ensuring the reduction in the liquid release amount and the increase in the liquid diffusibility.

It is another object of the present invention to prepare a water-absorbent resin ensuring the reduction in the liquid release amount and the increase in the liquid diffusibility, particularly, for use in sanitary materials.

SUMMARY OF THE INVENTION

In accordance with one aspect of the present invention, there is provided a process for preparing a water-absorbent resin by polymerization of a water-soluble ethylenic unsaturated monomer, which comprises the step of polymerizing the water-soluble ethylenic unsaturated monomer in the presence of a water-absorbent resin having a water-absorbing rate different from that of a water-absorbent resin resulting from polymerization of the water-soluble ethylenic unsaturated monomer.

In a preferred mode of the present invention, the polymerization is performed by a reversed-phase suspension polymerization method.

In accordance with another aspect of the present invention, there is provided a process for preparing a water-absorbent resin by polymerization of a water-soluble ethylenic unsaturated monomer, which comprises the steps of: preparing an aqueous solution containing the water-soluble ethylenic unsaturated monomer dissolved therein and a water-absorbent resin having a water-absorbing rate different from that of a water-absorbent resin resulting from polymerization of the water-soluble ethylenic unsaturated monomer; adding the aqueous solution to a hydrocarbon solvent and dispersing the aqueous solution therein; and heating the hydrocarbon solvent containing the aqueous solution dispersed therein to polymerize the water-soluble ethylenic unsaturated monomer contained in the aqueous solution.

In accordance with further another aspect of the present invention, there is provided a process for preparing a water-absorbent resin by polymerization of a water-soluble ethylenic unsaturated monomer, which comprises the steps of: adding an aqueous solution containing the water-soluble ethylenic unsaturated monomer to a hydrocarbon solvent and dispersing the aqueous solution therein; adding a water-absorbent resin having a water-absorbing rate different from that of a water-absorbent resin resulting from polymerization of the water-soluble ethylenic unsaturated monomer to the hydrocarbon solvent which contains the aqueous solution dispersed therein; and heating the hydrocarbon solvent containing the aqueous solution and the added water-absorbent resin to polymerize the water-soluble ethylenic unsaturated monomer contained in the aqueous solution.

In accordance with still another aspect of the present invention, there is provided a process for preparing a water-absorbent resin by polymerization of a water-soluble ethylenic unsaturated monomer, which comprises the steps of: polymerizing the water-soluble ethylenic unsaturated monomer to afford a slurry; and further adding the water-soluble ethylenic unsaturated monomer to the slurry, and polymerizing the added water-soluble ethylenic unsaturated monomer. In at least one of the aforesaid steps, the polymerization is allowed to take place in the presence of a water-absorbent resin having a water-absorbing rate different from that of a water-absorbent resin resulting from the polymerization of the water-soluble ethylenic unsaturated monomer.

In accordance with yet another aspect of the present invention, there is provided a process for preparing a water-absorbent resin by polymerization of a water-soluble ethylenic unsaturated monomer, which comprises the steps of: polymerizing the water-soluble ethylenic unsaturated monomer to afford a slurry; and adding to the slurry a water-absorbent resin having a water-absorbing rate different from that of a water-absorbent resin resulting from the polymerization of the water-soluble ethylenic unsaturated monomer, and adding the water-soluble ethylenic unsaturated monomer to the slurry, and polymerizing the added water-soluble ethylenic unsaturated monomer.

In the aforesaid processes according to the present invention, a water-soluble ethylenic unsaturated monomer is polymerized in the presence of a water-absorbent resin having a water-absorbing rate different from that of a water-absorbent resin resulting from polymerization of the water-soluble ethylenic unsaturated monomer. Thus, a water-absorbent resin can be prepared in which there is a compound of t he two components of water-absorbent resin having different water-absorbing rates, i.e., a compound of the water-absorbent resin resulting from the polymerization of the water-soluble ethylenic unsaturated monomer and the water-absorbent resin present in the polymerization reaction system. The water-absorbent resin thus prepared ensures the reduction in the release amount of liquid as well as the increase in the liquid diffusibility.

A water-absorbent resin according to the present invention comprises a first water-absorbent resin component resulting from polymerization of a water-soluble ethylenic unsaturated monomer and a second water-absorbent resin component having a water-absorbing rate different from that of the first water-absorbent resin component and compounded with the first water-absorbent resin component.

Since the water-absorbent resin contains the first and second water-absorbent resin components having different water-absorbing rates, the reduction in the release amount of liquid as well as the increase in the liquid diffusibility can be ensured.

The foregoing and other objects and effects will become apparent from the following detailed description.

DETAILED DESCRIPTION OF THE INVENTION

The polymerization method to be employed in the preparation processes of the present invention is not particularly limited, but any of various known polymerization methods such as reversed-phase suspension polymerization and aqueous solution polymerization can be employed. To produce a better effect, however, the reversed-phase suspension polymerization method is preferably employed. The preparation processes will hereinafter be described on the premise that the reversed-phase suspension polymerization method is employed.

The water-soluble ethylenic unsaturated monomer to be used in the present invention is not particularly limited, but any of those generally used for polymerization may be employed. Examples of specific water-soluble ethylenic unsaturated monomers include: acrylic acid, methacrylic acid, 2-acrylamide-2-methylpropanesulfonic acid, 2-methacrylamide-2-methylpropanesulfonic acid, and alkali salts (e.g., ammoniumsalts, alkalimetal salts and the like) thereof; nonionic monomers such as acrylamide, methacrylamide, N,N-dimethylacrylamide, 2-hydroxyethyl acrylate, 2-hydroxyethyl methacrylate, N-methylol acrylamide and N-methylol methacrylamide; and unsaturated monomers containing amino-group such as diethylaminoethyl acrylate, diethylaminoethyl methacrylate, diethylaminopropyl acrylate, diethylaminopropyl methacrylate, diethylaminopropyl acrylamide and diethylaminopropyl methacrylamide, and quaternary compounds thereof. These water-soluble ethylenic unsaturated monomers may be used either alone or in combination.

Among the aforesaid water-soluble ethylenic unsaturated monomers, acrylic acid and methacrylic acid and alkali salts thereof, acrylamide, methacrylamide and N,N-dimethylacrylamide are preferred in terms of industrial availability.

In the present invention, the water-soluble ethylenic unsaturated monomer is typically used in a state of an aqueous solution. The concentration of the water-soluble ethylenic unsaturated monomer in the aqueous solution is preferably between 25 wt % and a saturated concentration.

The aqueous solution of the water-soluble ethylenic unsaturated monomer is added to a hydrocarbon solvent and dispersed therein for the reversed-phase suspension polymerization of the water-soluble ethylenic unsaturated monomer. Usable as the hydrocarbon solvent are aliphatic hydrocarbon solvents, alicyclic hydrocarbon solvents and aromatic hydrocarbon solvents. Examples of specific aliphatic hydrocarbon solvents include n-hexane, n-heptane and ligroin. Examples of specific alicyclic hydrocarbon solvents include cyclopentane, methylcyclopentane, cyclohexane and methylcyclohexane. Examples of specific aromatic hydrocarbon solvents include benzene, toluene and xylene. Among these hydrocarbon solvents, n-hexane, n-heptane, cyclohexane, toluene and xylene are preferred because they are stable in quality and available at a low cost.

The aforesaid hydrocarbon solvents may be used either alone or in combination.

Preferably, a surface active agent or a polymer protective colloid is preliminarily added to the hydrocarbon solvent. The surface active agent and the polymer protective colloid may be used in combination.

The surface active agent to be used is not particularly limited, as long as the reversed-phase suspension polymerization of the water-soluble ethylenic unsaturated monomer can be effected in the aqueous solution. Examples of usable surface active agents include nonionic surface active agents such as sorbitan fatty acid esters, polyglycerin fatty acid esters, sucrose fatty acid esters, sorbitol fatty acid esters and polyoxyethylenealkyl phenyl ether. These nonionic surface active agents may be used either alone or in combination.

Examples of specific polymer protective colloids include ethyl cellulose, ethylhydroxyethyl cellulose, oxidized polyethylene, polyethylene modified with maleic anhydride, polybutadiene modified with maleic anhydride, and EPDM (ethylene-propylene-diene terpolymer) modified with maleic anhydride.

The aforesaid nonionic surface active agent and the polymer protective colloid may be used in combination with an anionic surface active agent such as a fatty acid salt, alkylbenzenesulfonate, alkylmethyltaurine salt, polyoxyethylenealkyl phenyl ether sulfate or polyoxyethylenealkyl ether sulfonate.

The surface active agent, the polymer protective colloid or a mixture of the surface active agent and the polymer protective colloid is typically used in an amount of 0.1 wt % to 5 wt %, preferably 0.2 wt % to 3 wt %, with respect to the aqueous solution of the water-soluble ethylenic unsaturated monomer. If the amount is less than 0.1 wt %, insufficient emulsification may result. The use in an amount of greater than 5 wt % is uneconomical, because an effect to be produced is not corresponding to the usage.

A crosslinking agent may be optionally used, for the polymerization. Preferably, the crosslinking agent is preliminarily added to the aqueous solution of the water-soluble ethylenic unsaturated monomer. The crosslinking agent to be used herein has two or more polymerizable unsaturated groups or reactive functional groups. Examples of specific crosslinking agents having two or more polymerizable unsaturated groups include di- or triacrylic esters and di- or trimethacrylic esters of polyols such as ethylene glycol, propylene glycol, trimethylolpropane, glycerol polyoxyethylene glycol, polyoxypropylene glycol and polyglycerol; unsaturated polyesters obtained by reacting the aforesaid polyols with an unsaturated acid such as maleic acid and fumaric acid; bisacrylamides such as N,N'-methylenebisacrylamide; di- or triacrylic esters and di- or trimethacrylic esters obtained by reacting polyepoxides with acrylic acid and with methacrylic acid, respectively; carbamyl diacrylate and carbamyl dimethacrylate obtained by reacting polyisocyanates such as tolylene diisocyanate and hexamethylene diisocyanate with hydroxyethyl acrylate and with hydroxyethyl methacrylate, respectively; allylated starch, allylated cellulose, diallyl phthalate, N,N',N''-triallyl isocyanurate, and divinylbenzene.

Among the aforesaid crosslinking agents having two or more polymerizable unsaturated groups, ethylene glycol diacrylate, ethylene glycol dimethacrylate, diethylene glycol diacrylate, diethylene glycol dimethacrylate, propylene glycol diacrylate, propylene glycol dimethacrylate, polyethylene glycol diacrylate, polyethylene glycol dimethacrylate, diallyl phthalate and N,N'-methylenebisacrylamide are preferred.

Examples of the crosslinking agents having two or more reactive functional groups include diglycidyl ether compounds, haloepoxy compounds and isocyanate compounds. Among those, the diglycidyl ether compounds are preferred.

Examples of specific diglycidyl ether compounds include ethylene glycol diglycidyl ether, polyethylene glycol diglycidyl ether, propylene glycol diglycidyl ether, polypropylene glycol diglycidyl ether, glycerol diglycidyl ether, and polyglycerol diglycidyl ether. Among those, ethylene glycol diglycidyl ether is particularly preferred.

Examples of specific haloepoxy compounds include epichlorohydrin, epibromohydrin and α-methylepichlorohydrin. Examples of specific isocyanate compounds include 2, 4-tolylene diisocyanate and hexamethylene diisocyanate.

The aforesaid crosslinking agent may have two or more polymerizable unsaturated groups and two or more reactive functional groups.

The crosslinking agent is typically used in an amount of 0.001 wt % to 5 wt % with respect to the water-soluble ethylenic unsaturated monomer. If the amount is less than 0.001 wt %, the resulting resin has a high water-solubility and is hence less functional as a water-absorbent resin. If the amount exceeds 5 wt %, the resulting resin does not exhibit satisfactory water-absorbing properties.

A radical polymerization initiator is used in the polymerization according to the present invention. The radical polymerization initiator to be used is preferably selected from conventional water-soluble radical polymerization initiators such as potassium persulfate, ammonium persulfate and sodium persulfate. The radical polymerization initiator can be used in combination with a sulfite as a redox-type initiator.

An oil-soluble radical polymerization initiator may also be used as the radical polymerization initiator. Where such an oil-soluble radical polymerization initiator is used, the resulting polymer is generally water-soluble, hence the crosslinking agent should be used to prepare the water-absorbent resin of the present invention. Preferably used as the oil-soluble radical polymerization initiator are benzoyl peroxide, and azobisisobutyronitrile.

The radical polymerization initiator is typically used in an amount of 0.005 mol % to 1.0 mol % with respect to the water-soluble ethylenic unsaturated monomer. If the amount is less than 0.005 mol %, much time is required for the polymerization. If the amount exceeds 1.0 mol %, a rapid polymerization reaction entailing a danger may result.

The polymerization temperature varies depending upon the polymerization initiator to be used, but typically 20° C. to 110° C., preferably 40° C. to 80° C. If the polymerization temperature is lower than 20° C., the polymerization rate is reduced, so that the polymerization process requires much time and is hence uneconomical. If the polymerization temperature is higher than 110° C., it is difficult to remove polymerization heat to facilitate the polymerization. The polymer of the water-soluble ethylenic unsaturated monomer is generally obtained in a state of a slurry.

The water-absorbent resin to be present in the polymerization reaction system has a water-absorbing rate different from that of a water-absorbent resin resulting from polymerization of the water-soluble ethylenic unsaturated monomer, i.e., a water-absorbing rate higher or lower than that of the water-absorbent resin to be prepared.

The water-absorbent resin to be present in the polymerization reaction system is not particularly limited, but any of various commercially available water-absorbent resins may be used. Examples of specific water-absorbent resins include starch type water-absorbent resins such as a hydrolyzate of a graft copolymer of starch and acrylonitrile and a neutralized graft copolymer of starch and acrylic acid, a saponified copolymer of vinyl acetate and acrylic acid ester, partially neutralized polyacrylic acid, a copolymer of maleic anhydride and isobutylene, and a polymer of the aforesaid water-soluble ethylenic unsaturated monomer. These water-absorbent resins may be used either alone or in combination.

Preferably used as the water-absorbent resin to be present in the polymerization reaction system is of the same type as the water-absorbent resin resulting from the polymerization of the water-soluble ethylenic unsaturated monomer.

Examples of specific water-absorbent resins to be preferably used are water-absorbent resins resulting from reversed-phase suspension homopolymerization or copolymerization of water-soluble ethylenic unsaturated monomers including acrylic acid, methacrylic acid, 2-acrylamide-2-methylpropanesulfonic acid, 2-methacrylamide-2-methylpropanesulfonic acid, and alkali salts (e.g., ammonium salts, alkali metal salts and the like) thereof; nonionic monomers such as acrylamide, methacrylamide, N,N-dimethylacrylamide, 2-hydroxyethyl acrylate, 2-hydroxyethyl methacrylate, N-methylol acrylamide and N-methylol methacrylamide; amino-containing unsaturated monomers such as diethylaminoethyl acrylate, diethylaminoethyl methacrylate, diethylaminopropyl acrylate, diethylaminopropyl methacrylate, diethylaminopropyl acrylamide and diethylaminopropyl methacrylamide, and quaternary compounds thereof. Among those, a water-absorbent resin comprised of a homopolymer or copolymer of acrylic acid or methacrylic acid or an alkali salt thereof, acrylamide, methacrylamide or N,N-dimethylacrylamide is preferred.

The amount of the water-absorbent resin to be present in the polymerization reaction system is preferably 1 wt % to 100 wt %, more preferably 5 wt % to 50 wt % with respect to the water-soluble ethylenic unsaturated monomer to be polymerized. If the amount is less than 1 wt %, it is difficult to afford the water-absorbent resin of interest in the present invention. If the amount exceeds 10 wt %, an uneconomical process may result and, in addition, the polymerization reaction system for the reversed-phase suspension polymerization becomes unstable, so that the resulting resin tends to bulk.

The method of allowing the water-absorbent resin to be present in the polymerization reaction system is not particularly limited. The water-absorbent resin is allowed to be present in any of various methods in the course of polymerization of the water-soluble ethylenic unsaturated monomer. More specifically, the water-absorbent resin is allowed to be present in the aqueous solution of the water-soluble ethylenic unsaturated monomer from the beginning. Alternatively, the aqueous solution of the water-soluble ethylenic unsaturated monomer is first added to the hydrocarbon solvent and dispersed therein, and then the water-absorbent resin is added to the hydrocarbon solvent.

In accordance with the present invention, the water-absorbent resin of interest may be prepared by a multi-stage polymerization process. At the first polymerization stage, the water-soluble ethylenic unsaturated monomer is polymerized. At the second polymerization stage, the water-soluble ethylenic unsaturated monomer is added to a slurry obtained by the polymerization at the first stage, and polymerized. In this case, the water-absorbent resin may be allowed to be present either in the first-stage polymerization reaction system or in the second-stage polymerization reaction system or, alternatively, in both of the first- and second-stage polymerization reaction systems.

The water-absorbent resin prepared by the preparation process of the present invention is a compound of a water-absorbent resin component having a higher water-absorbing rate and a water-absorbent resin component having a lower water-absorbing rate. The water-absorbent resin containing the water-absorbent resin components having different water-absorbing rates does not take a particular form, but can be in any of various forms such as powdery, granular, spherical and scale forms.

In the water-absorbent resin prepared by the preparation process of the present invention, the resin component having the higher water-absorption rate preferably offers a water-absorbing time of less than 10 seconds, more preferably less than 5 seconds. If the water-absorbing time is not less than 10 seconds, the resulting water-absorbent resin does not exhibit a satisfactory initial water-absorbency. On the other hand, the resin component having the lower water-absorbing rate preferably offers a water-absorbing time of longer than 20 seconds, more preferably longer than 30 seconds. If the water-absorbing time is not longer than 20 seconds, the water-absorbing rate is so high that the resulting water-absorbent resin is gelatinized and tends to cause blocking. Therefore, if the two water-absorbent resin components of the present water-absorbent resin do not satisfy the aforesaid requirements for the water-absorbing time, it is difficult for the water-absorbent resin to ensure the reduction in the amount of liquid released as well as the increase in the liquid diffusibility.

It is noted that the term "water-absorbing rate" is herein meant by the time required for 1 g of a water-absorbent resin to completely absorb 25 ml of a 0.9% saline solution with stirring. The water-absorbing rate can be determined in the following manner. First, 25 ml of the 0.9% saline solution is poured into a 50-ml beaker containing a rotator having a length of 20 mm and a diameter of 7 mm$\phi$, and then 1.0 g of the water-absorbent resin is added to the saline solution with stirring at a rotation speed of 500 rpm by means of a magnetic stirrer. The water-absobing rate is determined by measuring the elapsed time before it is visually confirmed that there is no free water in the beaker.

As described above, the water-absorbent resin prepared by the preparation process of the present invention is a compound of a plurality of water-absorbent resin components having different water-absorbing rates. Therefore, a water-absorbent material, for example, a sanitary material such as a menstrual article or a disposable diaper which employs the present water-absorbent resin can be imparted with a homogeneous water-absorbing property, unlike a case where a water-absorbent resin mixture prepared by simply mixing a plurality of water-absorbent resin having different water-absorbing rates is employed. Thus, the present invention can impart the water-absorbent resin with superior water-absorbing properties which is difficult to be achieved by the conventional water-absorbent resins. That is, the water-absorbent resin according to the present invention ensures the reduction in the release amount of the liquid as well as the increase in the liquid diffusibility. More specifically, a water-absorbent material produced by spreading the water-absorbent resin of the present invention in a pulp material can rapidly absorb liquid and extensively diffuse the absorbed liquid therein. Therefore, even if the supply rate of the liquid is high, the supplied liquid hardly leaks.

The water-absorbent resin according to the present invention can be used in a wide range of application fields including sanitary materials such as menstrual articles and disposable diapers, agricultural materials such as water retention agents and soil conditioning agents, and industrial materials such as cutoff materials and anti-dewing agents, but is particularly suitable for the sanitary materials.

The present invention will hereinafter be described in greater detail by way of examples thereof. In the following description, Examples are set forth in conjunction with corresponding Comparative Examples, which each precede Examples for easy understanding.

COMPARATIVE EXAMPLE 1

First, 550 ml of n-heptane was put in a 1-liter four-necked round flask provided with a stirrer, a reflux condenser, a dropping funnel and a nitrogen gas introduction tube. Then, 0.97 g of sorbitan monolaurate (surface active agent NONION LP-20R available from Nippon Yushi Co.) having an HLB of 8.6 was added to the solvent and dispersed therein. The solution was once heated up to 50° C. to dissolve the surface active agent therein, and then cooled to 30° C.

In turn, 92 g of an 80 wt % acrylic acid aqueous solution was prepared in a 500-ml Erlenmeyer's flask, and 152.6 g of a 20.1 wt % sodium hydroxide aqueous solution was added thereto drop by drop for 75 mol % neutralization in an ice bath to afford an aqueous solution of partially neutralized acrylic acid. Then, 0.11 g of potassium persulfate was added to the partially neutralized acrylic acid aqueous solution and dissolved therein.

The aqueous solution contained in the 500-ml Erlenmeyer's flask was all added to the solution in the four-necked round flask, and dispersed therein. After the atmosphere of the reaction system was replaced with nitrogen gas, the reaction system was heated up to 70° C., at which polymerization was allowed to proceed for 3 hours. Then, water and n-heptane were distilled off, and the resulting product was dried. Thus, 97.2 g of a water-absorbent resin was obtained. The water-absorbing time of the water-absorbent resin thus obtained was 3 seconds.

EXAMPLE 1-a

First, 550 ml of n-heptane was put in a 1-liter four-necked round flask provided with a stirrer, a reflux condenser, a dropping funnel and a nitrogen gas introduction tube. Then, 0.97 g of sorbitan monolaurate (surface active agent NONION LP-20R available from Nippon Yushi Co.) having an HLB of 8.6 was added to the solvent and dispersed therein. The solution was once heated up to 50° C. to dissolve the surface active agent therein, and then cooled to 30° C.

In turn, 92 g of an 80 wt % acrylic acid aqueous solution was prepared in a 500-ml Erlenmeyer's flask, and 152.6 g of a 20.1 wt % sodium hydroxide aqueous solution was added thereto drop by drop for 75 mol % neutralization in an ice bath. Then, 0.1 g of potassium persulfate was added to the resulting solution and dissolved therein. To a partially neutralized acrylic acid aqueous solution thus obtained was added 18.4 g of a water-absorbent resin (polymer of partially neutralized polyacrylic acid available under the trade name of "AQUAKEEP" from Sumitomo Seika Chemicals Co.) having a water-absorbing time of 45 seconds.

The solution contained in the 500-ml Erlenmeyer's flask was all added to the solution in the four-necked round flask, and dispersed therein. After the atmosphere of the reaction system was replaced with nitrogen gas, the reaction system was heated up to 70° C., at which polymerization was allowed to proceed for 3 hours. Then, water and n-heptane were distilled off, and the resulting product was dried. Thus, 115.7 g of a compounded water-absorbent resin was obtained.

EXAMPLE 1-b

In the same manner as in Comparative Example 1, the partially neutralized acrylic acid aqueous solution in the Erlenmeyer's flask was added to the solution containing the surface active agent dissolved therein in the four-necked round flask, and dispersed therein. To the resulting solution mixture was added 46.0 g of a water-absorbent resin (polymer of partially neutralized polyacrylic acid available under the trade name of "AQUAKEEP" from Sumitomo Seika Chemicals Co.) having a water-absorbing time of 45 seconds. Thereafter, the polymerization and subsequent steps were carried out in the same manner as in Example 1-a. Thus, 144.5 g of a compounded water-absorbent resin was obtained.

COMPARATIVE EXAMPLE 2

First, 550 ml of n-heptane was put in a 1-liter four-necked round flask provided with a stirrer, a reflux condenser, a dropping funnel and a nitrogen gas introduction tube. Then, 1.38 g of hexaglyceryl monobehenylate (surface active agent NONION GV-106 available from Nippon Yushi Co.) having an HLB of 13.1 was added to the solvent, and dispersed therein. The solution was once heated up to 50° C. to dissolve the surface active agent therein, and then cooled to 30° C.

In turn, 92 g of an 80 wt % acrylic acid aqueous solution was prepared in a 500-ml Erlenmeyer's flask, and 152.6 g of a 20.1 wt % sodium hydroxide aqueous solution was added thereto drop by drop for 75 mol % neutralization in an ice bath. Then, 0.11 g of potassium persulfate and 0.019 g of ethylene glycol diglycidyl ether as a crosslinking agent were added to the resulting splution, and dissolved therein. Thus, a partially neutralized acrylic acid aqueous solution was prepared.

The aqueous solution contained in the 500-ml Erlenmeyer's flask was all added to the solution in the four-necked round flask, and dispersed therein. After the atmosphere of the reaction system was replaced with nitrogen gas, the reaction system was heated up to 70° C., at which polymerization was allowed to proceed for 3 hours. Then, water and n-heptane were distilled off, and the resulting product was dried. Thus, 98.3 g of a water-absorbent resin was obtained. The water-absorbing time of the water-absorbent resin thus obtained was 48 seconds.

EXAMPLE 2

In the same manner as in Comparative Example 2, the partially neutralized acrylic acid aqueous solution in the Erlenmeyer's flask was added to the solution containing the surface active agent dissolved therein in the four-necked round flask, and dispersed therein. To the resulting solution mixture was added 9.2 g of a water-absorbent resin (polymer of partially neutralized polyacrylic acid available under the trade name of "AQUAKEEP" from Sumitomo Seika Chemicals Co.) having a water-absorbing time of 2 seconds. Thereafter, the polymerization and subsequent steps were carried out in the same manner as in Comparative Example 2. Thus, 106.0 g of a compounded water-absorbent resin was obtained.

COMPARATIVE EXAMPLE 3

First, 550 ml of n-heptane was put in a 1-liter four-necked round flask provided with a stirrer, a reflux condenser, a dropping funnel and a nitrogen gas introduction tube. Then, 1.38 g of hexaglyceryl monobehenylate (surface active agent NONION GV-106 available from Nippon Yushi Co. ) having an HLB of 13.1 was added to the solvent, and dispersed therein. The solution was once heated up to 50° C. to dissolve the surface active agent therein, and then cooled to 30° C.

In turn, 92 g of an 80 wt % acrylic acid aqueous solution was prepared in a 500-ml Erlenmeyer's flask, and 152.6 g of a 20.1 wt % sodium hydroxide aqueous solution was added thereto drop by drop for 75 mol % neutralization in an ice bath. Then, 0.11 g of potassium persulfate and 0.019 g of ethylene glycol diglycidyl ether as a crosslinking agent were added to the resulting solution, and dissolved therein. Thus, a partially neutralized acrylic acid aqueous solution was prepared.

The aqueous solution contained in the 500-ml Erlenmeyer's flask was all added to the solution in the four-necked round flask, and dispersed therein. After the atmosphere of the reaction system was replaced with nitrogen gas, the reaction system was heated up to 70° C., at which first-stage polymerization was allowed to proceed for 3 hours.

A polymer slurry resulting from the first-stage polymerization was cooled to 20° C., and then a partially neutralized acrylic acid aqueous solution prepared in the aforesaid manner was added thereto drop by drop in the same amount as used in the first-stage polymerization. After the atmosphere of the reaction system was fully replaced with nitrogen gas for 30 minutes, the reaction system was heated up to 70° C., at which second-stage polymerization was allowed to proceed for 3 hours. Then, water and n-heptane were distilled off, and the resulting product was dried. Thus, 196.5 g of a water-absorbent resin was obtained. The water-absorbing time of the resin thus obtained was 57 seconds.

EXAMPLE 3

The polymerization process was performed in substantially the same manner as in Comparative Example 3, except that 18.4 g of a water-absorbent resin (polymer of partially neutralized polyacrylic acid available under the trade name of "AQUAKEEP" from Sumitomo Seika Chemicals Co.) having a water-absorbing time of 2 seconds was preliminarily added to the partially neutralized acrylic resin aqueous solution to be used in the second-stage polymerization. Thus, 212.2 g of a compounded water-absorbent resin was obtained.

EVALUATION

The amount of water absorbed, initial water-absorbing time, water-absorbing time, release amount of water and longitudinal diffusion expanse of water-absorbent resins prepared in Examples 1 to 3 and Comparative Examples 1 to 3 were measured in the following manner for evaluation of the resins. The results are shown in Table 1.

(1) Water Absorption Amount (g/g)

A rotator and 200 ml of a 0.9% saline solution were put in a 300-ml beaker, and 1.0 g of a water-absorbent resin was added thereto with stirring by means of a magnetic stirrer. After the solution was stirred for 1 hour, the swollen water-absorbent resin was filtered by means of a 200-mesh wire gauze and weighed for determination of the amount of water absorbed (g) per gram of the water-absorbent resin.

(2) Initial Water-absorbing Time

A rotator having a length of 20 mm and a diameter of 7 mm φ and 10 ml of a 0.9% saline solution were put in a 50-ml beaker. Then, 1.0 g of a water-absorbent resin was added thereto with stirring at a rotation speed of 500 rpm by means of a magnetic stirrer, and the elapsed time before it was visually confirmed that there was no free water was measured.

(3) Water-absorbing Time

The water-absorbing time was measured in the manner previously mentioned.

(4) Release Amount and Longitudinal Diffusion Expanse

First, 5 g of a water-absorbent resin was uniformly spread on a cut pulp sheet having dimensions of 40 cm×14 cm and a unit weight of 80 g/m², and then another cut pulp sheet having the same dimensions and weight was overlaid thereon. Next, the combined pulp sheets thus formed were pressed with a load of 2 kg/cm², thereby a water-absorbent material was prepared. Subsequently, 150 ml of a 1.6% saline solution was poured around the center of the water-absorbent material within 1 minutes, and the water-absorbent material was allowed to stand for 5 minutes. Then, a pile of 20 cut filter paper sheets (Toyo filter paper No. 2) having dimensions of 10 cm×10 cm were placed on the center of the water-absorbent material, and a 3.5 kg weight (having a bottom area of 10 cm×10 cm) was placed on the filer paper sheets to impose a load thereon for 3 minutes. The amount of the saline solution absorbed by the filter paper sheets was measured for determination of the release amount. The longitudinal expanse of the saline solution absorbed and diffused in the water-absorbent material was measured for determination of the longitudinal diffusion expanse.

TABLE 1

|   | Amount of water absorbed (g/g) | Initial water-absorbing time(sec) | Water-absorbing time (sec) | Release amount (g) | Longitudinal diffusion expanse (cm) |
|---|---|---|---|---|---|
| Ex.1-a | 67 | 2 | 18 | 1.5 | 22 |
| Ex.1-b | 65 | 5 | 25 | 1.3 | 24 |
| Ex.2 | 63 | 7 | 35 | 0.5 | 28 |
| Ex.3 | 62 | 8 | 42 | 0.2 | 29 |
| Com. Ex.1 | 72 | 1 | 3 | 15.2 | 15 |
| Com. Ex.2 | 61 | 18 | 48 | 5.5 | 30 |
| Com. Ex.3 | 63 | 29 | 57 | 6.2 | 32 |

The present invention can be embodied in various forms without departing from the spirit and principal features of the present invention. Therefore, the aforementioned embodiments are merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

What is claimed is:

1. A process for preparing a water-absorbent resin by polymerization of a water-soluble ethylenic unsaturated monomer, comprising;

adding an aqueous solution of the water-soluble ethylenic unsaturated monomer to a hydrocarbon solvent and dispersing the aqueous solution therein;

adding a water-absorbent resin having a water-absorbing rate different from that of a water-absorbent resin resulting from polymerization of the water-soluble ethylenic unsaturated monomer to the hydrocarbon solvent; and polymerizing the water-soluble ethylenic unsaturated monomer in the presence of the water-absorbent resin added to the hydrocarbon solvent, wherein the water-soluble ethylenic unsaturated monomer is at least one member selected from the group consisting of acrylic-acid, methacrylic acid, 2-acrylamide-2-methylpropanesulfonic acid, 2-methacrylamide-2-methylpropanesulfonic acid, and alkali salts thereof; acrylamide, methacrylamide, N,N - dimethylacrylamide, 2-hydroxyethyl acrylate, 2-hydroxyethyl methacrylate, N-methylol acrylamide, and N-methylol methacrylamide; and diethylaminoethyl acrylate, diethylaminoethyl methacrylate, diethylaminopropyl acrylate, diethylaminopropyl methacrylate, diethylaminopropyl acrylanride, diethyl aminopropyl methacrylamide, and quaternary compounds thereof, the water absorbent resin to be present during the polymerization is at least one member selected from the group consisting of a hydrolyzate of a graft copolymer of starch and acrylonitrile, a neutralized graft copolymer of starch and acrylic acid, a saponified copolymer of vinyl acetate and acrylic acid ester, partially neutralized polyacrylic acid, a copolymer of maleic anhydride and isobutylene, and a polymer of a water-soluble ethylenic unsaturated monomer, and a water-absorbing time of the water-absorbent resin to be present during polymerization is less than 10 seconds or longer than 20 seconds.

2. A process as set forth in claim 1, wherein the polymerization is performed by a reversed-phase suspension polymerization method.

3. A process as set forth in claim 1, wherein the amount of the water-absorbent resin to be present during the polymerization is 1 wt % to 100 wt % with respect to the water-soluble ethylenic unsaturated monomer.

4. A process as set forth in claim 3, wherein the water-absorbent resin to be present during the polymerization is of the same monomers as the water-absorbent resin resulting from the polymerization of the water-soluble ethylenic unsaturated monomer.

5. A process as set forth in claim 1, wherein the polymer of the water-soluble ethylenic unsaturated monomer is at least one selected from homopolymers and copolymers of monomers selected from the group consisting of acrylic acid, methacrylic acid, an alkali salt of acrylic acid, an alkali salt of methacrylic acid, acrylamide, methacrylamide and N,N-dimethylacrylamide.

6. A process for preparing a water-absorbent resin by polymerization of a water-soluble ethylenic unsaturated monomer, comprising:

preparing an aqueous solution containing the water-soluble ethylenic unsaturated monomer dissolved therein and a water-absorbent resin having a water-absorbing rate different from that of a water-absorbent resin resulting from polymerization of the water-soluble ehtylenic unsaturated monomer;

adding the aqueous solution to a hydrocarbon solvent and dispersing the aqueous solution therein; and heating the hydrocarbon solvent containing the aqueous solution dispersed therein to polymerize the water-soluble ethylenic unsaturated monomer contained in the aqueous solution, wherein, a water-absorbing time of the water-absorbent resin contained in the aqueous solution is less than 10 seconds or longer than 20 seconds, the water-soluble ethylenic unsaturated monomer is at least one member selected from, the group consisting of acrylic acid, methacrylic acid, 2-acrylaide-2-methylpropanesulfonic acid, 2-methacrylamide-2-methylpropanesulfonic acid, 2-methacrylamide-2-methylpropanesulfonic acid, and alkali salts thereof; acrylamide, methacrylamide, N,N-dimethylacrylamide, 2-hydroxyethyl acrylate, 2-hydroxyethyl methacrylate, N-methylol acrylamide, and N-methylol methacrylamide; and diethylaminoethyl acrylate, diethylaminoethyl methacrylate, diethylaminopropyl acrylate, diethylaminopropyl methacrylate, diethylaminopropyl acrylamide, diethylaminopropyl methacrylamide, and quaternary compounds thereof, and the water absorbent resin contained in the aqueous solution is at least one member selected from the group consisting of a hydrolyzate of a graft copolymer of starch and acrylonitrile, a neutralized graft copolymer of starch and acrylic acid, a saponified copolymer of vinyl acetate and acrylic acid ester, partially neutralized polyacrylic acid, a copolymer of maleic anhydride and isobutylene, and a polymer of a water-soluble ethylenic unsaturated monomer.

7. A process as set forth in claim 6, wherein at least one of a surface active agent and a polymer protective colloid is preliminarily added to the hydrocarbon solvent.

8. A process as set forth in claim 6, wherein the amount of the water-absorbent resin contained in the aqueous solution is 1 wt % to 100 wt % with respect to the water-soluble ethylenic unsaturated monomer.

9. A process as set forth in claim 8, wherein the water-absorbent resin contained in the aqueous solution is of the same monomers as the water-absorbent resin resulting from the polymerization of the water-soluble ethylenic unsaturated monomer.

10. A process as set forth in claim 6, wherein the polymer of the water-soluble ethylenic unsaturated monomer is at least one selected from homopolymers and copolymers of monomers selected from the group consisting of acrylic acid, methacrylic acid, an alkali salt of acrylic acid, an alkali salt of methacrylic acid, acrylamide, methacrylamide and N,N-dimethylacrylamide.

11. A process as set forth in claim 6, wherein the aqueous solution further contains a crosslinking agent.

12. A process as set forth in claim 11, wherein the amount of the crosslinking agent to be used is 0.001 wt % to 5 wt % with respect to the water-soluble ethylenic unsaturated monomer.

13. A process for preparing a water-absorbent resin by polymerization of a water-soluble ethylenic unsaturated monomer, comprising:

adding an aqueous solution containing the water-soluble ethylenic unsaturated monomer to a hydrocarbon solvent to which at least one of a surface active agent and a polymer protective colloid is preliminarily added and dispersing the aqueous solution therein;

adding a water-absorbent resin having a water-absorbing rate different from that of a water-absorbent resin resulting from polymerization of the water-soluble ethylenic unsaturated monomer to the hydrocarbon solvent which contains the aqueous solution dispersed therein; and heating the hydrocarbon solvent containing the aqueous solution and the added water-absorbent resin to polymerize the water-soluble ethylenic unsaturated monomer contained in the aqueous solution, wherein, the amount of the water-absorbent resin added to the hydrocarbon solvent is 1 wt % to 100 wt % with respect to the water-soluble ethylenic unsaturated monomer, the water-soluble ethylenic unsaturated monomer is at least one member selected from the group consisting of acrylic acid, methacrylic acid, 2-acrylamide-2-methylpropanesulfonic acid, 2-methacrylamide-2-methylpropanesulfonic acid, and alkali salts thereof, acrylamide, methacrylamide, N,N-dimethylacrylamide, 2-hydroxyethyl acrylate, 2-hydroxyethyl methacrylate, N-methylol acrylamide, and N-methylol methacrylamide; and diethylaminoethyl acrylate, diethylaminoethyl methacrylate, diethylaminopropyl acrylate, diethylaminopropyl methacrylate, diethylaminopropyl acrylamide, diethylaminopropyl methacrylamide, and quaternary compounds thereof, the water absorbent resin added to the hydrocarbon solvent is at least one member selected from the group consisting of a hydrolyzate of a graft copolymer of starch and acrylonitrile, a neutralized graft copolymer of starch and acrylic acid, a saponified copolymer of vinyl acetate and acrylic acid ester, partially neutralized polyacrylic acid, a copolymer of maleic anhydride and isobutylene, and a polymer of a water-soluble ethylenic unsaturated monomer, and a water-absorbing time of the water-absorbent resin added to the hydrocarbon solvent is less than 10 seconds or longer than 20 seconds.

14. A process as set forth in claim 13, wherein the polymer of the water-soluble ethylenic unsaturated monomer is at least one selected from homopolymers and copolymers of monomers selected from the group consisting of acrylic acid, methacrylic acid, an alkali salt of acrylic acid, an alkali salt of methacrylic acid, acrylamide, methacrylamide and N,N-dimethylacrylamide.

15. A process as set forth in claim 13, wherein the water-absorbent resin added to the hydrocarbon solvent is of the same monomers as the water-absorbent resin resulting from the polymerization of the water-soluble ethylenic unsaturated monomer.

16. A process as set forth in claim 13, wherein the aqueous solution containing the water-soluble ethylenic unsaturated monomer further contains a crosslinking agent.

17. A process as set forth in claim 16, wherein the amount of the crosslinking agent to be used is 0.001 wt % to 5 wt % with respect to the water-soluble ethylenic unsaturated monomer.

18. A process for preparing a water-absorbent resin by polymerization of a water-soluble ethylenic unsaturated monomer, comprising:

polymerizing the water-soluble ethylenic unsaturated monomer at a first polymerization stage;

adding the water-soluble ethylenic unsaturated monomer to a slurry obtained by the first polymerization stage; and polymerizing the added water-soluble ethylenic unsaturated monomer at a second polymerization stage, wherein, in at least one of the polymerization stages, a water-absorbent resin having a water-absorbing rate different from that of a water absorbent resin resulting from the polymerization of the water-soluble ethylenic unsaturated monomer is added to the polymerization, the water-soluble ethylenic unsaturated monomer is at least one member selected from the group consisting of acrylic acid, methacrylic acid, 2-acrylamide-2-methylpropanesulfonic acid, 2-methacrylamide-2-methylpropanesulfonic acid, and alkali salts thereof, acrylamide, methacrylamide, N,N-dimethylacrylamide, 2-hydroxyethyl acrylate, 2-hydroxyethyl methacrylate, N-methylol acrylamide, and N-methylol methacrylamide; and diethylaminoethyl acrylate, diethylaminoethyl methacrylate, diethylaminopropyl acrylate, diethylaminopropyl methacrylate, diethylaminopropyl acrylamide, diethylaminopropyl methacrylamide, and quaternary compounds thereof, and the water absorbent resin added to the polymerization is at least one member selected from the group consisting of a hydrolyzate of a graft copolymer of starch and acrylonitrile, a neutralized graft copolymer of starch and acrylic acid, a saponified copolymer of vinyl acetate and acrylic acid ester, partially neutralized polyacrylic acid, a copolymer of maleic anhydride and isobutylene, and a polymer of a water-soluble ethylenic unsaturated monomer.

19. A process for preparing a water-absorbent resin by polymerization of a water-soluble ethylenic unsaturated monomer, comprising:

polymerizing the water-soluble ethylenic unsaturated monomer at a first polymerization stage;

adding a mixture including the water-soluble ethylenic unsaturated monomer and a water-absorbent resin to a slurry obtained by the first polymerization stage; and polymerizing the water-soluble ethhylenic unsaturated monomer in the mixture at a second polymerization stage, wherein, the water-absorbent resin in the-mixture has a water-absorbing rate different from that of a water-absorbent resin resulting from the polymerization of the water-soluble ethylenic unsaturated monomer, the water-soluble ethylenic unsaturated monomer is at least one member selected from the group consisting of acrylic acid, methacrylic acid, 2-acrylamide-2-methylpropanesulfonic acid, 2-methacrylamide-2-methylpropanesulfonic acid, and alkali salts thereof; acrylamide, methacrylamide, N,N-dimethylacrylamide, 2-hydroxyethyl acrylate, 2-hydroxyethyl methacrylate, N-methylol acrylamide, and N-methylol methacrylamide; and diethylaminoethyl acrylate, diethylaminoethyl methacrylate, diethylaminopropyl acrylate, diethylaminopropyl methacrylate, diethylaminopropyl acrylamide, diethylaminopropyl methacrylamide, and quaternary compounds thereof, and the water absorbent resin in the mixture is at least one member selected from the group consisting of a hydrolyzate of a graft copolymer of starch and acrylonitrile, a neutralized graft copolymer of starch and acrylic acid, a saponified copolymer of vinyl acetate and acrylic acid ester, partially neutralized polyacrylic acid, a copolymer of maleic anhydride and isobutylene, and a polymer of a water-soluble ethylenic unsaturated monomer.

20. A water-absorbent resin comprising:

a first-water-absorbent resin component having a water-absorbing time of less than 10 seconds; and a second water-absorbent resin component compounded with the first water-absorbent resin component and having a water-absorbing time of longer than 20 seconds.

* * * * *

UNITED STATES PATENT AND TRADEMARK OFFICE
CERTIFICATE OF CORRECTION

PATENT NO. : 6,573,330 B1  Page 1 of 1
DATED : June 3, 2003
INVENTOR(S) : Fujikake et al.

It is certified that error appears in the above-identified patent and that said Letters Patent is hereby corrected as shown below:

<u>Title page,</u>
Below Item [57], ABSTRACT, replace "20 Claims, No Drawings" should be
-- 19 Claims, No Drawings --

<u>Column 12,</u>
Line 67, replace "acrylanride" with -- acrylamide --

<u>Column 13,</u>
Line 52, delete "," after the word "from".

<u>Column 14,</u>
Line 60, replace "thereof," with -- thereof; --

<u>Column 15,</u>
Line 54, replace "thereof," with -- thereof; --

<u>Column 16,</u>
Line 25, replace "the-mixture" with -- the mixture --

Claim 31 was canceled in the prosecution and should be completely deleted.

Signed and Sealed this

Twenty-sixth Day of July, 2005

JON W. DUDAS
*Director of the United States Patent and Trademark Office*